United States Patent
Goldberg

(10) Patent No.: US 6,851,929 B2
(45) Date of Patent: Feb. 8, 2005

(54) SYSTEM FOR POWERING AND CONTROLLING A DEVICE ASSOCIATED WITH A ROTATING COMPONENT ON AIRCRAFT

(75) Inventor: Joshua I. Goldberg, Woodbridge, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 217 days.

(21) Appl. No.: 10/101,908

(22) Filed: Mar. 19, 2002

(65) Prior Publication Data

US 2003/0180145 A1 Sep. 25, 2003

(51) Int. Cl.[7] ............................................. F03D 00/00
(52) U.S. Cl. ........................... 416/1; 415/118; 318/811
(58) Field of Search .................. 416/1, 95, 61; 415/118; 318/811, 599, 139

(56) References Cited

U.S. PATENT DOCUMENTS

| | | | | |
|---|---|---|---|---|
| 4,060,212 A | * | 11/1977 | Magenheim | 244/134 D |
| 4,292,502 A | * | 9/1981 | Adams | 219/483 |
| 4,380,146 A | * | 4/1983 | Yannone et al. | 60/39.141 |
| 5,315,232 A | * | 5/1994 | Stewart | 324/72 |
| 5,519,275 A | * | 5/1996 | Scott et al. | 310/112 |
| 5,770,909 A | * | 6/1998 | Rosen et al. | 310/113 |
| 5,929,607 A | * | 7/1999 | Rosenberg et al. | 320/166 |
| 6,054,947 A | * | 4/2000 | Kosowsky | 342/191 |
| 6,094,989 A | * | 8/2000 | Twerdochlib | 73/659 |
| 6,145,787 A | * | 11/2000 | Rolls | 244/134 R |
| 6,340,847 B1 | * | 1/2002 | Kawabata et al. | 290/40 C |

* cited by examiner

Primary Examiner—Edward K. Look
Assistant Examiner—James M. McAeenan
(74) Attorney, Agent, or Firm—Carlson, Gaskey & Olds

(57) ABSTRACT

A system for providing power and communication signals to a device associated with a rotating component on an aircraft includes a communication strategy that allows power and command signals to be propagated along the same conductors. A stationary controller provides power and command signals to a controller that is supported for rotation with the rotating device. Only two slip rings are required to communicate power and command signals between the stationary and rotating controllers. Synchronous modulation preferably is used for sending the command signals to avoid interference from noise inherent in slip ring electrical couplings. A multi-zone propeller deicing heater is one example device that is controllable using the inventive approach.

20 Claims, 4 Drawing Sheets

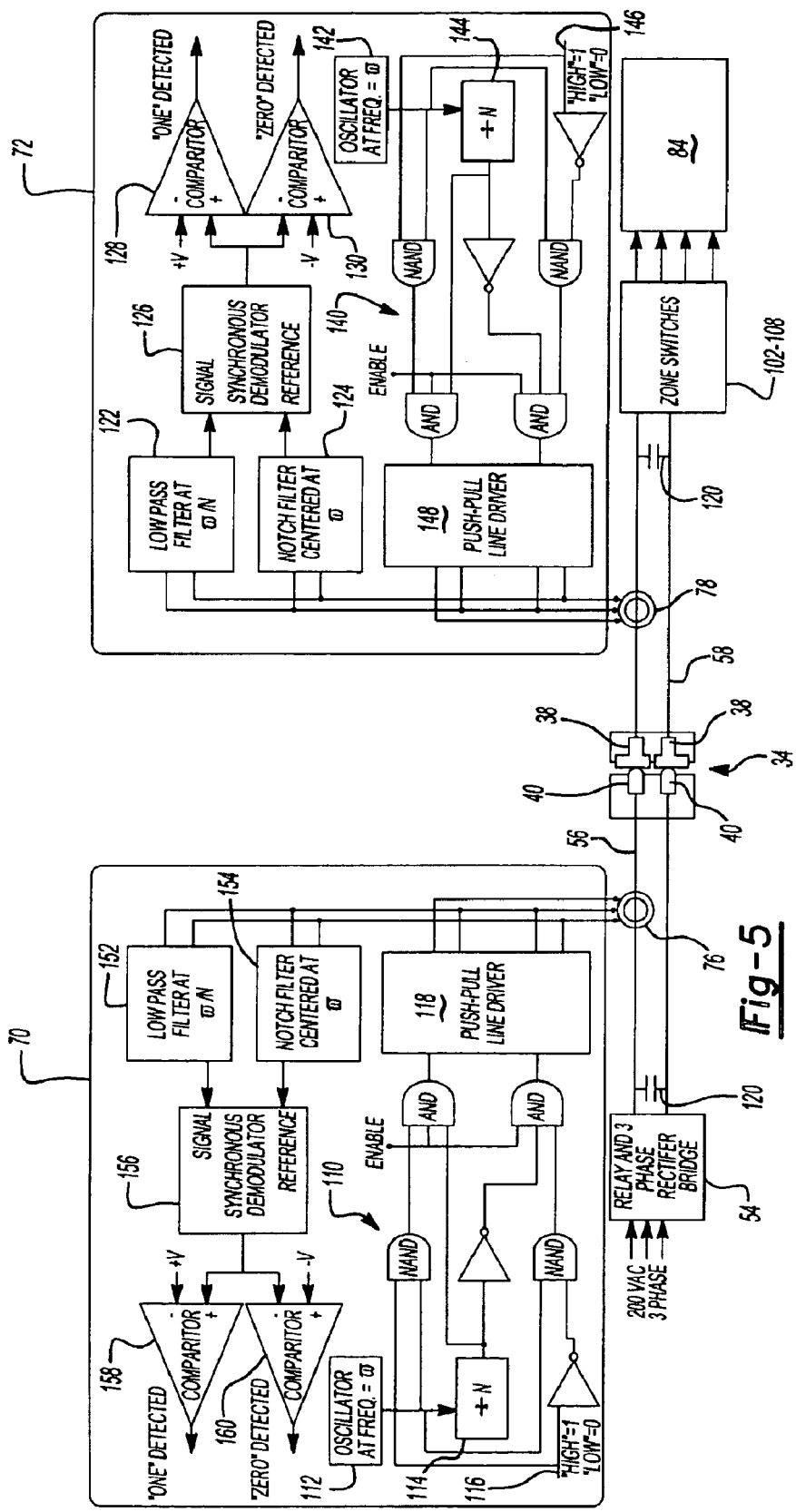

SYSTEM FOR POWERING AND CONTROLLING A DEVICE ASSOCIATED WITH A ROTATING COMPONENT ON AIRCRAFT

BACKGROUND OF THE INVENTION

This invention generally relates to providing electrical power and communication signals to a device associated with a rotating portion of an aircraft. More particularly, this invention relates to a simplified arrangement utilizing the same conductors for providing power and a plurality of communication signals to at least one device associated with a rotating component, such as a propeller assembly, on an aircraft across an electrical coupling that accommodates relative rotation.

Modern day aircraft typically include rotating components such as propellers that may have various devices associated with them. One example is a deicing device associated with propeller blades to prevent ice buildup on the propeller blades during flight. One example deicing device includes electric heaters that are controlled by a controller associated with the propeller assembly. It is useful to provide different heating zones for each propeller blade. Such heaters require a plurality of control or communication signals to achieve the desired operation of the various portions of the heater device. The heating elements preferably are selectively turned on to manage power usage, especially under conditions where power supply is limited.

Because devices such as the electric deicing heaters require multiple control signals and three-phase power, relatively complex electrical coupling arrangements typically are provided to communicate such signals between a controller that remains stationary relative to the rotating components of the propeller assembly. In one example, a relatively high number of slip rings are required to provide power and to communicate the control signals to each of the sections of the heater device. In one example, nine slip rings are required to achieve the desired amount of communication and control. Additionally, three-phase heaters on propeller assemblies with a blade count that is not a multiple of three require three electrical lead connections per blade. Minimizing such connections is desirable to enhance reliability.

Such arrangements are undesirably expensive and relatively cumbersome because of the number of components required. The additional slip rings also add additional weight, which is undesirable.

There is a need for an improved arrangement for communicating power and control signals to devices that are associated with rotating components such as propeller assemblies on aircraft. This invention addresses that need while avoiding the shortcomings and drawbacks of the prior art.

SUMMARY OF THE INVENTION

In general terms, this invention is a system for communicating power and control signals to a device associated with a rotating component, such as a propeller assembly on an aircraft. An electrical coupling that communicates the power and control signals along the same conductors accommodates relative rotary movement between a controller that remains stationary on the aircraft and a device control portion that is associated with the rotating portion of the propeller assembly.

In one example, the electrical coupling includes only two slip rings, which represents a significant reduction in parts compared to prior arrangements. Additionally, the inventive arrangement only requires two electrical lead connections per blade, which further reduces parts and enhances reliability.

One example system for providing power and control information to a device associated with a rotating component of an aircraft that is designed according to this invention includes a power supply supported on the aircraft that remains stationary when the rotating component rotates. An electrical coupling accommodates the relative rotation between the device and the power supply and conducts electrical power from the power supply to the device as needed. A device controller is supported relative to the rotating component so that the controller rotates with the device. A stationary controller is supported on the aircraft to remain stationary when the rotating component rotates. The stationary controller communicates with the device controller through the electrical coupling using synchronously modulated communication signals that are transmitted through the electrical coupling in addition to the power from the power supply.

In one example embodiment of this invention, the device controller and the stationary controller each include a communication portion that sends and receives the communication signals. Each communication portion includes a reference signal generator that provides a reference signal with a selected frequency $\omega$. Each communication portion provides at least one message or command signal having a frequency $\omega/N$, where N is an integer. The synchronously modulated communication signals comprise a sum of the message signal and the reference signal. In one example, the synchronously modulated communication signals comprise binary ones or zeros that comprise a sum of the positive phase of the message signal and the reference signal or a sum of the negative phase of the message signal in a reference signal, respectively.

A method of providing power and control information to a device associated with a rotating component of an aircraft having one controller that remains stationary relative to the aircraft and another controller associated with the device that is supported to rotate with the rotating component includes several steps. The first controller provides power to the device across an electrical coupling, such as a slip ring assembly. The first controller also provides communication signals to the device controller over the same electrical coupling. The device controller receives the control signals and responsively controls the device.

In one example, the device controller sends a synchronously modulated confirmation message to the first controller indicating that the communication signals were received and that the device is being appropriately controlled. The first controller receives such a message and further monitors the current draw across the electrical coupling to determine that the device is, in fact, being controlled as desired.

The various features and advantages of this invention will become apparent to those skilled in the art from the following detailed description of the currently preferred embodiment. The drawings that accompany the detailed description can be briefly described as follows.

BRIEF DESCRIPTION OF THE DRAWINGS

FIG. 5 schematically illustrates selected portions of FIGS. 3 and 4, respectively.

DETAILED DESCRIPTION OF THE PREFERRED EMBODIMENTS

Figure 1:
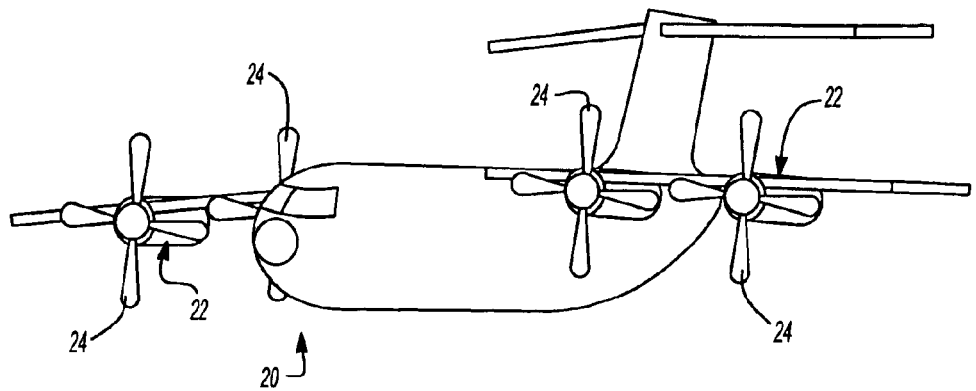
FIG. 1 diagrammatically illustrates an aircraft incorporating a system designed according to this invention.

FIG. 1 illustrates an aircraft 20 having a plurality of propeller assemblies 22 that include propeller blades 24 that rotate in a conventional fashion for flying the aircraft 20 as desired. Although the illustration shows an airplane, this invention is not necessarily limited to such an aircraft. This invention also has applicability for helicopters, for example.

Figure 2:
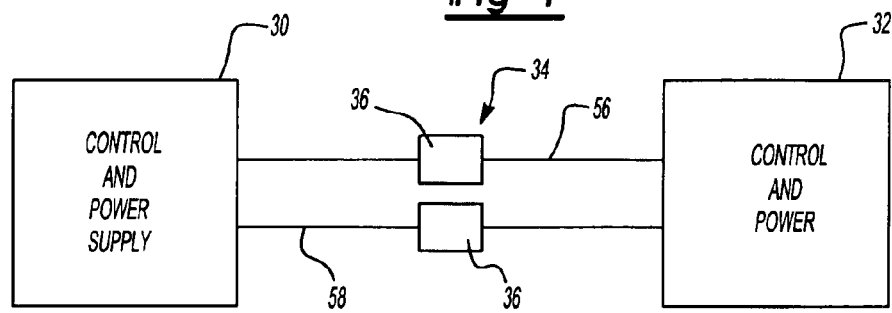
FIG. 2 schematically illustrates a system designed according to this invention.

One or more electrically powered devices are associated with the rotating propeller blades 24 of the propeller assemblies 22. FIG. 2 schematically illustrates a system designed according to this invention for providing power and control signal communication to such devices. A stationary controller 30 is supported on the aircraft 20 to remain stationary relative to the aircraft. A rotating device controller 32 is supported as part of the propeller assembly such that it rotates with rotating components of the propeller assembly as needed. An electrical coupling 34 accommodates the relative rotation between the components while allowing power supply and communication signal propagation between the controller 30 and the device controller 32.

In one example, the electrical coupling 34 includes only two slip ring assemblies 36. As can be appreciated from FIG. 4, each slip ring assembly includes a ring 38 and a plurality of conductive brushes 40 that operate in a conventional manner. According to this invention, the number of brushes can be minimized and, in one example, the preferred number of brushes 40 per slip ring 38 is two.

Figure 3:
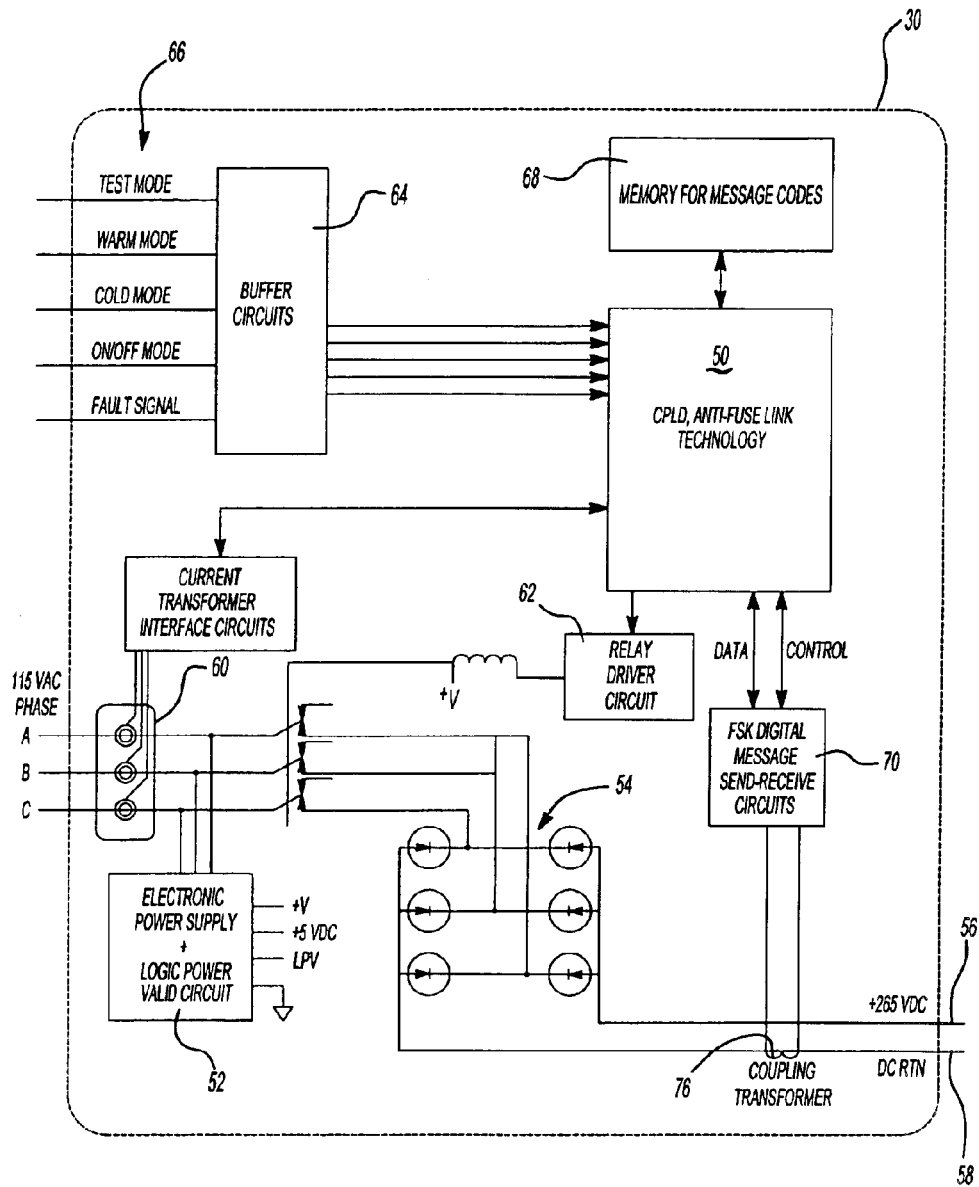
FIG. 3 schematically illustrates, in somewhat more detail, one portion of the embodiment of FIG. 2.

FIG. 3 schematically illustrates one example controller 30 that is adapted to be supported to remain stationary on the aircraft 20. A complex programmable logic device (CPLD) 50 is programmed to control the power supply and communication signals supplied by the controller 30. In the illustrated example, a power supply 52 provides conditioned voltages and current to electronics 50, 60, 62, 64, 68 and 70. A full wave diode 54 or a silicone controlled rectifier bridge (not illustrated) provides power along the conductors 56 and 58 as determined necessary by the CPLD 50. The illustrated example accommodates three phase AC input power, which is accommodated through a current transformer 60 and an emergency disconnect relay 62, both of which comprise known components.

Buffer circuits 64 receive signals 66 from other electronic components on the aircraft 20. The signals 66 are provided to the CPLD 50 so that appropriate control of one or more devices associated with the propeller assemblies 22 operate as needed. The illustrated example includes a memory portion 68 containing look up table or other data base that is accessed by the CPLD 50 to interpret the signals 66 and to provide the necessary signals to be sent through a communication portion 70 so that they are received by the appropriate electronics associated with the propeller assemblies 22.

Figure 4:
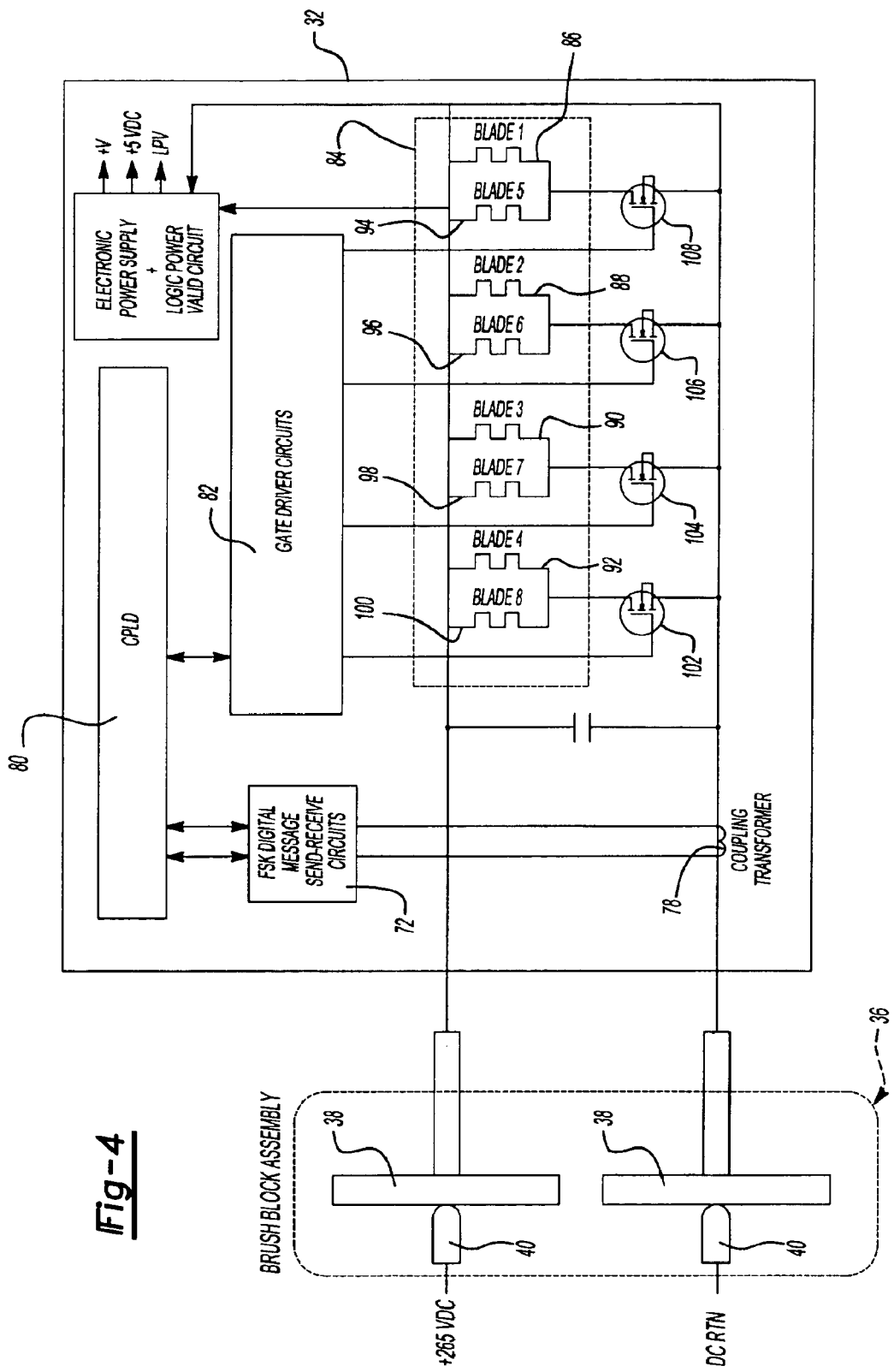
FIG. 4 schematically illustrates, in somewhat more detail, a second portion of the embodiment of FIG. 2.

Referring to FIG. 4, the device controller 32 includes a communication portion 72 that receives the signals from the communication portion 70. The communication portions 70 and 72 preferably are capable of sending and receiving communication signals so that bidirectional communication occurs between the controllers 30 and 32. A coupling transformer 76 allows the communication portion 70 to send or receive signals along the conductors 56 and 58. A coupling transformer 78 facilitates the same for the communication portion 72.

The controller 32 includes a complex programmable logic device (CPLD) 80 that is programmed to operate driver circuits 82 to cause a desired operation of a device 84 associated with the propeller assembly 22. The illustrated device 84 is an electric deicing heater that prevents the accretion of ice on the propeller blades 24 during flight as needed. A propeller blade deicing device is one example electrically powered device that is operable using the arrangement and strategy of this invention. A deicing device is particularly well suited to benefit from this invention because, as can be appreciated from the illustration, a plurality of control signals are required to operate the different zones or portions of the device 84.

In the illustrated example, a plurality of heating elements or zones are provided, each associated with a different blade 24 of the propeller assembly 22. Each heating element is schematically illustrated at 86–100 in FIG. 4. By selectively powering each of these electrical heating elements, selected zones or portions of the device 84 can be operated to achieve the necessary ice buildup prevention.

In the illustrated example, the CPLD 80 determines, based upon signals received from the controller 30, which of the driver circuits 82 need to be operated to turn on a selected one of the switches 102, 104, 106, 108 or a combination of more than one of those.

The inventive arrangement facilitates providing power to operate each of the heating elements 86–100 and control signals indicating which of those portions should be activated across the same conductors 56 and 58 and the electrical coupling 34. With this invention, a substantial reduction in size, weight and complexity of an electrical communication system is achieved. Additionally, the reliability of the system is enhanced because of the reduction of the number of parts. Prior to this invention, such a deicing heating device required a minimum of nine slip rings and multiple leads for each propeller blade 24. With this invention, two slip rings and two leads (not illustrated) per blade is all that is required to achieve the necessary power distribution and control signal communication.

In one example system, the stationary controller 30 sends control signals through the communication portion 70 to the device controller 32 where they are received by the communication portion 72. Example communication or command signals include commands to turn on or turn off particular portions or zones of the device 84. Other communication signals are within the scope of this invention. The device controller 32 then sends a confirmation message or signal through the communication portion 72 back to the controller 30 where the confirmation message is received by the communication portion 70. In this manner, the controllers 30 and 32 communicate and the controller 32 is able to verify that messages sent were received and the corresponding device operations have been implemented. The confirmation message from the controller 32 preferably identifies the specific portion of the device 84 that has been activated responsive to the command signal from the controller 30.

Additionally, the controller 30 preferably uses the current transformer 60 to monitor the amount of current being drawn at the rotating side of the assembly to operate the device 84. By monitoring the current draw, the controller 30 is able to independently determine that the device 84 is being operated as desired.

This invention includes providing the communication and command signals across the same conductors 56 and 58 that are used to provide power to the device 84. One example implementation of this invention includes using communication signals that have a frequency that is much higher than the frequency of the power transmitted across the conductors 56 and 58. Because of the inherently noisy operation of the slip ring assemblies 36 in the electrical coupling 34, the communication and control signals preferably are synchronously modulated so that the required information is exchanged between the controllers 30 and 32. The communication portions 70 and 72 preferably are capable of synchronously modulating the control or communication signals with a reference signal prior to sending them to the other device. Similarly, each communication portion 70, 72 is capable of synchronously demodulating the received signals. The illustrated implementation of this invention includes implementing the Fourier principle that the average value of the noise associated with communicating such signals across the electrical coupling 34 will be cancelled out by the synchronous demodulation.

Although each controller 30 and 32 is schematically illustrated in FIGS. 3 and 4 as if they have separate portions or components, those limitations are for discussion purposes only. Various portions of the illustrated example may be incorporated into one or more microprocessors, for example. Accordingly, the distinctions between functions and components shown in the illustrations are not necessarily limiting on the scope of this invention.

One example of the communication portions 70 and 72 is illustrated schematically in FIG. 5. The communication portion 70 of the controller 30 includes a signal generating portion 110. An oscillator or clock 112 provides a reference signal having a selected frequency, ω. The reference signal is propagated through the signal generating circuit 110, which includes a divider 114 that divides the frequency ω by an integer N. The signal having the ω/N frequency is the message or command signal in this example. The CPLD 50 preferably is programmed to control the input at 116 such that the reference signal from the oscillator 112 is added to the positive phase of the divided signal to transmit a binary one or added to the negative phase of the divided signal to transmit a binary zero. A push-pull line driver portion 118 drives the transformer 76 such that the algebraically summed reference signal and divided signal (i.e., the message or command) are transmitted across the electrical coupling 34 (i.e., the slip rings 38).

Bypass capacitors 120 preferably are provided within the conductive loop having the conductors 56 and 58 and the electrical coupling 34 so that the communication signals from the communication portions 70 and 72 are appropriately transmitted and received as desired. The bypass capacitors 120 effectively close the communication loop for such signals. Because the power transmitted across the same slip rings 38 as the communication signals has a much lower frequency than that of the communication signals, the bypass capacitors preferably are chosen so that they do not have any effect on the transmission of power to the device 84.

The communication signals from the communication portion 70 are received by the communication portion 72, which includes filters 122 and 124 and a synchronous demodulator 126. The filter 122 preferably is a low pass filter that is centered at ω/N. The filter 124 in the illustrated example is a notch filter centered at ω. With the filters 122 and 124, the synchronous demodulator 126 receives only the communication signals or other signals along the conductors 56 and 58 that are in the desired frequency range.

In the synchronous demodulator 126, any noise that occurs because of the nature of the slip ring assemblies 36 in the electrical coupling 34 is effectively cancelled out and the content of messages within the communication signals can be discerned. Comparators 128 and 130 communicate the binary ones and zeros from the message or command signals to the CPLD 80 of the controller 32.

The communication portion 72 has a signal generating portion 140 that resembles the signal generating portion 110 of the communication portion 70. An oscillator 142, a divider portion 144 and a control input 146 operate to provide the reference signal and the divided signal to a push-pull line driver portion 148 that drives the coupling transformer 78 to induce a communication signal message current to flow in the power conducting loop including the conductors 56 and 58.

Messages from the communication portion 72 are received through the coupling transformer 76 and filtered using a low pass filter 152 and a notch filter 154 that operates similar to the filters 122 and 124 described above. A synchronous demodulator 156 synchronously demodulates the signals received and the detected binary ones and zeros are provided by comparators 158 and 160, respectively, to the CPLD 50 so that the message can be interpreted and processed as necessary.

The communication signals preferably include synchronous modulation so that the signal can be transmitted across the same conductors as the power through the electrical coupling 34. The communication signals, which include self-contained information, can then be synchronously demodulated by the other communication portion so that effective communication occurs across the same electrical coupling 34 that is responsible for power conduction and the number of slip rings required is greatly reduced compared to prior arrangements.

Figure 6:
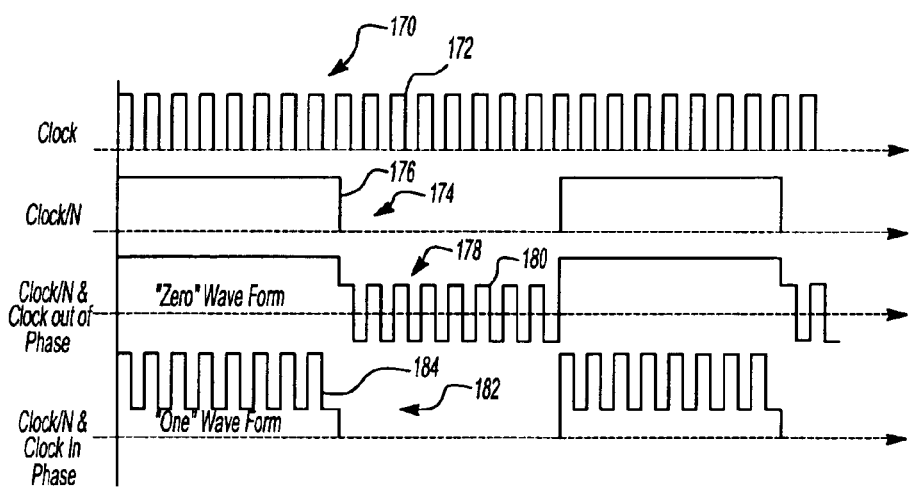
FIG. 6 is a timing diagram graphically illustrating a communication strategy that is useful with an example implementation of this invention.

Referring to FIG. 6, an example signal arrangement is graphically illustrated. A plot 170 shows a reference signal 172, which has, for the sake of discussion, a 200 Kilohertz frequency. A second plot 174 shows the divided (i.e., ω/N) signal 176, which in the illustrated example has a frequency of 20 Kilohertz. In this example, N=10.

The plot 178 includes a signal 180 that is the zero wave form when the reference signal 172 is algebraically summed with the negative phase of the divided signal 176. The signal 180 is that which is transmitted across the electrical coupling 34 between the communication portions when a zero binary is required for the message. A plot 182 includes a signal 184 that corresponds to the reference signal 172 being algebraically summed with the positive phase of the divided signal 176. The signal 184 is that which is propagated across the electrical coupling 34 to represent a binary one in the communication signal. The synchronous demodulators 126 and 156 receive the signals 180 or 184 and, after demodulating them, arrive at the signal 176. Accordingly, the signal 176 in the illustrated example contains the actual message or command information even though the signals 180 and 184 are those which are propagated across the conductors 56 and 58 through the electrical coupling 34.

An example arrangement designed according to this invention that greatly reduces the number of slip ring connections required and allows for communication signals to be propagated along the same conductors as power for powering a device such as a propeller deicing device having multiple zones has been described. This invention has applications beyond deicing devices. Any situation where a rotating component within a propeller assembly requires a plurality of control signals and power may be operated using the inventive approach. Those skilled in the art who have the benefit of this description will realize what situations will benefit from the principles of this invention. Similarly, those skilled in the art who have the benefit of this description will be able to select the appropriate components and to suitably program microprocessors or CPLD's to achieve the results of this invention to meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A system for providing power and control information to a device associated with a rotating component of an aircraft, comprising:
   a power supply supported on the aircraft that remains stationary when the rotating component rotates;
   an electrical coupling that accommodates relative rotation between the device and the power supply and conducts electrical power from the power supply to the device;
   a device controller supported to rotate with the device; and
   a stationary controller supported on the aircraft to remain stationary when the rotating component rotates, the stationary controller communicating with the device controller using synchronously modulated communication signals that are transmitted through the electrical coupling.

2. The system of claim 1, wherein the electrical coupling has only two slip rings and a plurality of conductive brushes associated with each ring.

3. The system of claim 1, wherein the device controller and the stationary controller each include a communication portion that sends and receives the communication signals, each communication portion provides a reference signal with a selected frequency $\omega$ and a message signal having a frequency $\omega/N$, where N is an integer, and wherein the synchronously modulated communication signals comprise a sum of the message signal and the reference signal.

4. The system of claim 3, wherein the synchronously modulated communication signals comprise binary ones or zeros and wherein the ones comprise a sum of the positive phase of the message signal and the reference signal and the zeros comprise a sum of the negative phase of the message signal and the reference signal.

5. The system of claim 1, wherein the device comprises an electric heater used to prevent ice build up on a propeller having a plurality of zones and wherein the synchronously modulated communication signals comprise commands to activate at least one of the zones.

6. The system of claim 5, wherein the stationary controller issues at least one command to the device controller to selectively activate or deactivate at least one of the zones and the device controller issues confirmation messages to the stationary controller indicating that the device controller has received the command and has responsively activated or deactivated the corresponding zone.

7. The system of claim 5, wherein the stationary controller includes a transformer that provides an indication of an amount of current draw across the electrical coupling and wherein the stationary controller determines whether the device is being operated consistent with the command by determining the amount of current draw.

8. The system of claim 5, wherein the rotating component comprises a propeller assembly having a plurality of propeller blades and the electrical coupling has only two slip rings and a plurality of conductive brushes associated with each ring and wherein the heater zones are each associated with a corresponding one of the propeller blades and there are only two electrical leads between each blade and the slip rings.

9. A method of powering and controlling a device associated with a rotating component on an aircraft, comprising the steps of:
   providing an electrical coupling that accommodates relative rotation between the device and another portion of the aircraft;
   supplying power to the device across the electrical coupling; and
   sending synchronously modulated communication signals to the device across the same electrical coupling including at least one command signal indicative of a desired operation of the device.

10. The method of claim 9, wherein the electrical coupling has only two slip rings and a plurality of conductive brushes associated with each slip ring.

11. The method of claim 9, including synchronously demodulating the communication signals at the device and controlling the device responsive to the command signals and sending at least one confirmation signal back across the electrical coupling indicating that the command signal was received and responsive action taken.

12. The method of claim 9, including synchronously modulating the communication signals by adding a reference signal having a selected frequency $\omega$ to a selected phase of the command signal having a frequency $\omega/N$, where N is an integer.

13. A propeller assembly for use on an aircraft, comprising:
   a plurality of propeller blades supported to rotate relative to another portion of the aircraft;
   at least one electrical device supported to rotate with the propeller blades;
   a power supply supported on the aircraft that remains stationary when the propeller blades rotate;
   an electrical coupling that accommodates relative rotation between the electrical device and the power supply and conducts electrical power from the power supply to the device;
   a device controller supported to rotate with the device; and
   a stationary controller supported on the aircraft to remain stationary when the propeller blades rotate, the stationary controller communicating with the device controller using synchronously modulated communication signals that are transmitted through the electrical coupling.

14. The assembly of claim 13, wherein the electrical coupling has only two slip rings and a plurality of conductive brushes associated with each ring.

15. The assembly of claim 13, wherein the device controller and the stationary controller each include a communication portion that sends and receives the communication signals, each communication portion provides a reference signal with a selected frequency $\omega$ and a message signal having a frequency $\omega/N$, where N is an integer, and wherein the synchronously modulated communication signals comprise a sum of the message signal and the reference signal.

16. The assembly of claim 15, wherein the synchronously modulated communication signals comprise binary ones or zeros and wherein the ones comprise a sum of the positive phase of the message signal and the reference signal and the zeros comprise a sum of the negative phase of the message signal and the reference signal.

17. The assembly of claim 13, wherein the device comprises an electric heater used to prevent ice build up on the blades, the heater having a plurality of zones at least one of the zones being associated with each of the propeller blades and wherein the synchronously modulated communication signals include a command to activate at least one of the zones.

18. The assembly of claim 17, wherein the stationary controller issues at least one command to the device controller to selectively activate or deactivate at least one of the zones and the device controller issues a confirmation message to the stationary controller indicating that the device controller has received the command and has responsively activated or deactivated the corresponding zone.

19. The assembly of claim 17, wherein the stationary controller includes a transformer that provides an indication of an amount of current draw across the electrical coupling and wherein the stationary controller determines whether the heater is being operated consistent with the command by determining the amount of current draw.

20. The assembly of claim 17, wherein the electrical coupling has only two slip rings and a plurality of conductive brushes associated with each ring and wherein the heater zones are each associated with a corresponding one of the propeller blades and there are only two electrical leads between each blade and the slip rings.

* * * * *